United States Patent [19]

Allen

[11] Patent Number: 5,306,332
[45] Date of Patent: Apr. 26, 1994

[54] COLUMNAR FILTERING UNIT FOR SPRAY PAINTING

[75] Inventor: George E. Allen, Carol Stream, Ill.

[73] Assignee: Air-Gonomics, Inc., Addison, Ill.

[21] Appl. No.: 996,497

[22] Filed: Dec. 23, 1992

Related U.S. Application Data

[63] Continuation of Ser. No. 860,307, Mar. 27, 1992, abandoned, which is a continuation of Ser. No. 699,912, May 14, 1991, abandoned.

[51] Int. Cl.$^5$ .................. B01D 29/21; B01D 29/54
[52] U.S. Cl. ........................ 95/273; 55/341.1; 55/465; 55/498; 55/502; 55/508; 55/521; 55/DIG. 46; 454/53
[58] Field of Search ............ 55/97, 341.1, 341.6, 55/497–502, 505, 507, 508, 521, DIG. 46, 434, 436, 439, 462, 465; 98/115.2; 118/DIG. 7

[56] References Cited

U.S. PATENT DOCUMENTS

| | | |
|---|---|---|
| 1,745,908 | 2/1930 | Paasche . |
| 2,347,728 | 5/1944 | Bell .................... 55/439 X |
| 3,016,984 | 1/1962 | Getzin .................. 55/498 X |
| 3,075,337 | 1/1963 | Andreae .................. 55/446 |
| 3,320,927 | 5/1967 | Szczepanski .............. 55/497 X |
| 3,486,626 | 12/1969 | Close .................... 55/498 X |
| 3,616,618 | 11/1971 | Gronholz et al. .......... 55/436 X |
| 3,750,622 | 8/1973 | Repp et al. .............. 55/237 X |
| 3,777,706 | 12/1973 | Kaufman ................ 55/341.1 X |
| 3,811,371 | 5/1974 | Hardy .................. 98/115.5 B |
| 3,847,577 | 11/1974 | Hansen .................. 55/498 X |
| 4,008,060 | 2/1977 | Andreae .................. 55/446 |
| 4,105,562 | 8/1978 | Kaplan et al. .......... 55/341.1 X |
| 4,113,454 | 9/1978 | Cvacho ................. 55/436 X |
| 4,243,397 | 1/1981 | Tokar et al. ............ 55/498 X |
| 4,245,551 | 1/1981 | Berkmann ............... 55/502 X |
| 4,277,260 | 7/1981 | Browning ................ 55/273 |
| 4,303,426 | 12/1981 | Battis ................... 55/498 |
| 4,321,064 | 3/1982 | Vargo .................... 55/1 |
| 4,375,487 | 3/1983 | Huber .................... 427/195 |
| 4,378,728 | 4/1983 | Berkmann .............. 55/502 X |
| 4,430,956 | 2/1984 | Koch, II ................. 118/326 |
| 4,471,715 | 9/1984 | Gubler et al. ............ 118/324 |
| 4,504,292 | 3/1985 | Vöhringer .............. 55/DIG. 46 |
| 4,506,625 | 3/1985 | Vöhringer .............. 55/DIG. 46 |
| 4,559,138 | 12/1985 | Harms, II ............... 55/502 X |
| 4,664,684 | 5/1987 | Dunn et al. ............. 55/498 |
| 4,820,320 | 4/1989 | Cox ..................... 55/508 X |
| 4,871,380 | 10/1989 | Meyers ................. 55/502 X |
| 4,874,412 | 10/1989 | Nowack ................ 55/DIG. 46 |
| 4,878,930 | 11/1989 | Manniso et al. .......... 55/498 X |
| 4,910,047 | 3/1990 | Barnett et al. ........... 427/195 |
| 4,924,801 | 5/1990 | Arnone .................. 118/58 |
| 4,928,624 | 5/1990 | Overton, Jr. ............. 118/308 |
| 4,955,990 | 9/1990 | Napadow ............... 55/436 X |
| 5,032,153 | 7/1991 | Cattin .................. 55/462 X |

FOREIGN PATENT DOCUMENTS

| | | |
|---|---|---|
| 848447 | 10/1952 | Fed. Rep. of Germany ........ 55/434 |
| 2350488 | 4/1975 | Fed. Rep. of Germany ........ 55/498 |
| 3400072 | 7/1985 | Fed. Rep. of Germany ..... 98/115.2 |
| 3406464 | 9/1985 | Fed. Rep. of Germany . |
| 3644489 | 8/1988 | Fed. Rep. of Germany ........ 55/434 |
| 62-018221 | 4/1987 | Japan .................. 55/DIG. 46 |
| WO89/02788 | 9/1987 | PCT Int'l Appl. ............ 98/115.2 |
| 1546109 | 2/1990 | U.S.S.R. ................... 55/462 |

*Primary Examiner*—Robert Spitzer
*Attorney, Agent, or Firm*—Roper & Quigg

[57] ABSTRACT

A cross-draft spray booth is provided with an exhaust system, an air inlet and at least one columnar filtering unit. The columnar filtering unit includes a support frame, an exhaust outlet and a filtering medium in the shape of a column. The columnar filtering unit is preferably cylindrical, and utilizes non-porous filtering material.

31 Claims, 3 Drawing Sheets

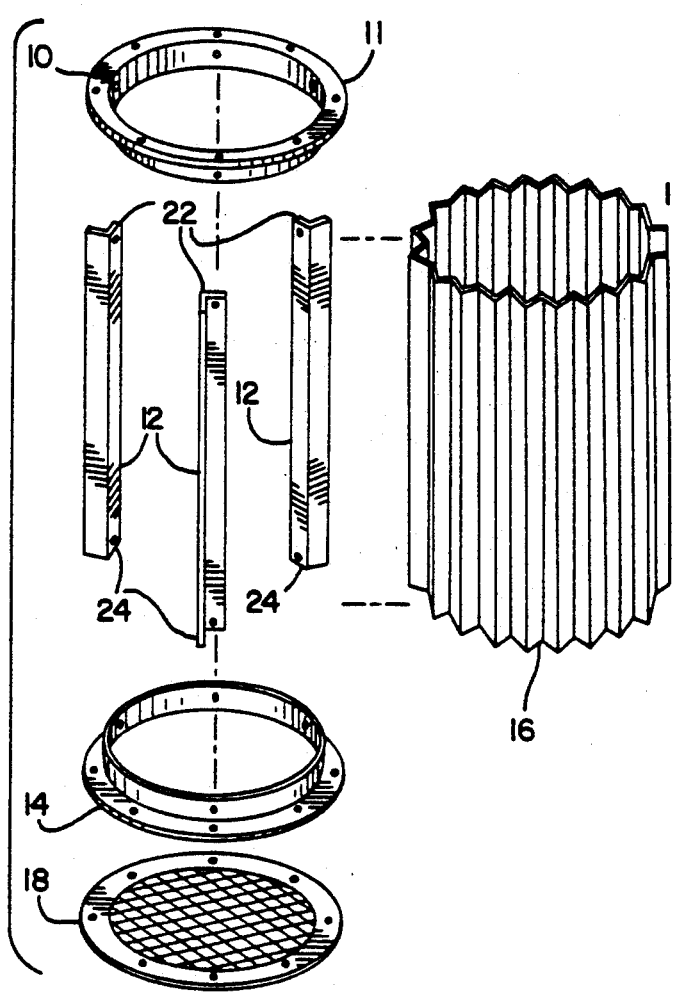
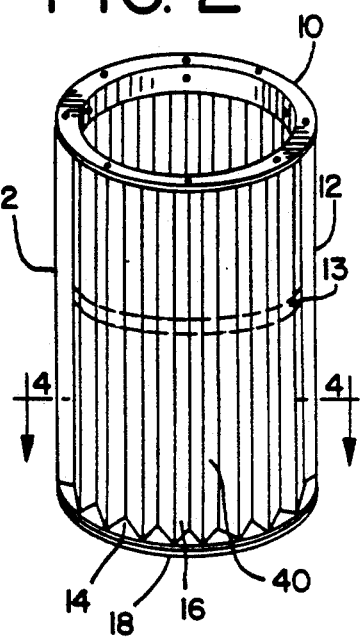
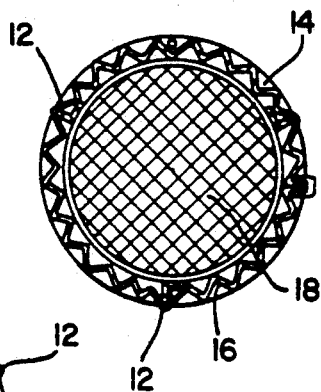
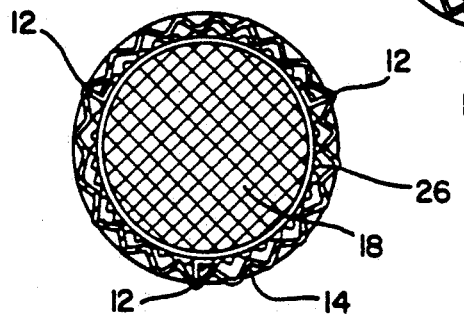
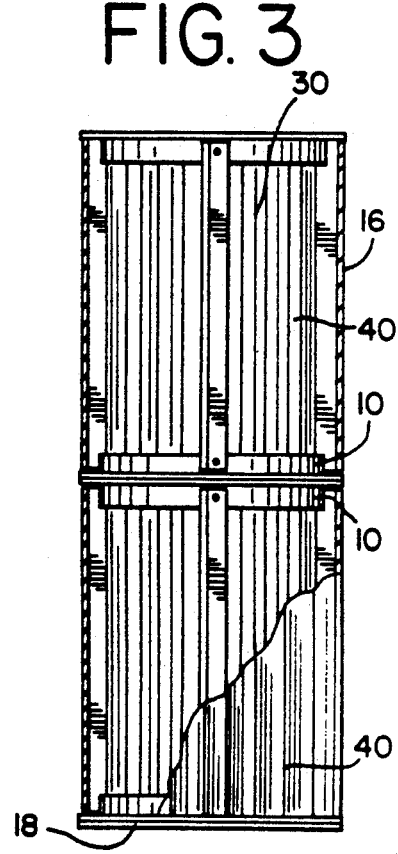

COLUMNAR FILTERING UNIT FOR SPRAY PAINTING

This is a continuation of application Ser. No. 07/860,307 filed Mar. 27, 1992, now abandoned, which was a continuation of application Ser. No. 07/699,912 filed May 14, 1991, now abandoned.

BACKGROUND OF THE INVENTION

This invention is directed generally to filter systems for removing particulate matter from fluid streams in spray coating operations, and more particularly to a novel filter apparatus. The present invention provides an inexpensive and easily constructed filter made of readily available materials which offers extended filter life due to its shape and arrangement. It also provides a means of arranging the filters in spraying operations which results in maximum filter life and minimum down time.

Many manufactured objects require a coating with a protective or decorative coat of paint or some other protective material before they can be used. This coating may be applied by brushing, rolling, dipping, or spraying. The present invention is concerned with the spray application of a coating.

The spray application of a coating may be done by three general methods: air atomization, wherein coating particles ride on a fluid stream from the spray gun to the object being coated; airless atomization, utilizing hydraulic pressure to atomize and propel the coating; and electrostatic spraying, utilizing air or airless atomization and deposition of the coating by electrical attraction between the coating particles and the object being coated.

When spray coating by any of these methods, an environment is created that is hazardous to the person performing the work, the operation itself, and the atmosphere as a whole. For that reason, present day spray booths are designed to rapidly and thoroughly remove both volatile fumes (which are present when an operation such as spray painting takes place, which utilizes particulate dissolved in a liquid solvent) and particulate overspray from work areas. The spray booths create a safe environment for workers, minimizes pollution of the atmosphere, and maximizes the efficiency of the coating operation by removing overspray, thereby preventing finish-marring consequences of semi-dry coating particles settling on already coated surfaces.

Typically, a cross-draft spray booth consists of an enclosure within which the actual coating will take place. The enclosure has an air inlet and an exhaust. By drawing air into the enclosure and subsequently exhausting the air, an air flow is created that carries both fumes and overspray from the booth. The air flow passes through filters before exiting to remove solid particulate. The filters are located in the same enclosure where the coating takes place. The air is then exhausted to the atmosphere.

The industry generally uses planar filter arrangements in a cross-draft spray booth. In this system, a fluid stream is drawn through a planar sheet of filtering material that is stretched across the width and height of the open face of the booth. The filter bank actually creates an exhaust chamber, from which an exhaust fan draws air.

The advantage of this type of system is that the filtering materials used are cheap and are generally thrown away when dirty. When one planar sheet of filter material becomes clogged to the point that the exhaust fan cannot function properly, it is replaced with a new sheet, which is obtained from sheets or rolls of filter material which are readily available. Further, cross-draft spray booths can be used for all types of coating operations, including wet operations which utilize particulate dissolved in a solvent, and dry operations, which utilize particulate mixed with air.

The primary disadvantage of the conventional cross-draft booth is that as air is passed through the filter bank, solid particulate gradually builds up. Eventually the build up prevents the exhaust fan from operating properly. At this point, production must stop while the dirty filters are removed and replaced. The frequency of the shut down time is directly related to the volume of particulate that the filters are able to hold before becoming so clogged that the exhaust fan can no longer draw air effectively.

It is an object of this invention to provide a novel filter arrangement which extends filter life, thereby minimizing the frequency of down time and increasing productivity.

It is a further object of this invention to utilize readily available and inexpensive filter media currently used in cross-draft type spray booths.

SUMMARY OF THE INVENTION

This invention provides an improved type of filter, useful in all types of spray coating operations, offering the advantage of inexpensive, simplified construction combined with extended filter life. Filters embodying the present invention overcome the major problem of the prior art, namely, the quick clogging and frequent down time of cross-draft booths. The present invention can be used in all types of coating operations and can easily be constructed with inexpensive and readily available cross-draft filter materials. The expected use of the system is predominately in wet operations.

The present invention achieves these objects through a unique columnar configuration for the filter, rather than the conventional planar configuration. The columnar shape of the filter gives it an extended life because of the resulting baffle effect and unique, wrap-around air flow. Due to the baffle effect and wrap-around air flow, spray booths using the present invention require filter changes five to eight times less frequently than conventional cross-draft booths.

Because the particulate in the overspray of a coating operation has weight and travels with some velocity, it will naturally travel in a somewhat straight line towards the front of the columnar filter, which is positioned in such a manner as to take advantage of the uni-directional air stream created in a cross-draft spray booth. This causes the particulate to accumulate on the side of the columnar filtering unit which is closest to the coating operation. As the coating operation progresses, the portion of the columnar filtering unit closest to the coating operation slowly becomes loaded with particulate, until it becomes completely clogged. At this point, a conventional cross-draft filter would have to be replaced. In the present invention, however, the coating operation can continue. The front portion of the filter, which is loaded with particulate, becomes a baffle, which continues to accumulate the particulate that is unable to change direction of travel and reach the sides or back of the columnar filtering unit. At the same time, the baffle forces air flow to wrap around the sides of the column to the uncoated portions of the filter, which continue to transmit air and allow the exhaust fan to operate efficiently. The booth continues to provide overspray and fume evacuation.

In the preferred embodiment, the columnar filtering unit is cylindrical and consists of a support frame and a filter material. The frame includes a top support ring, a bottom support ring, and vertical support members which connect the top and bottom support rings to create the columnar frame. The frame is then wrapped with a flexible air-penetrable supporting medium such as a wire grid to form a cylinder, which is then wrapped with the filter media. This embodiment utilizes filter media that are semi-rigid and somewhat self-supporting, such as matte-type material and also utilizes filter media that are not self supporting, such as blanket type filter media. An alternate embodiment does not include the wire grid, in which case a stiffer, more self-supporting filter media is used, such as the Andreae-type arrestor media. A bottom closure seals the bottom of the cylindrical unit.

While the preferred embodiment is cylindrical, other shapes for the columnar filter unit can be utilized. Thus, the present invention includes square, rectangular, triangular, polygonal, elliptical, and other shaped columns. In addition, the present invention can include a baffle means such as a baffle plate, on the side of the column closest to the spraying operation. In this embodiment, the baffle effect and wrap-around air flow is achieved from the beginning of the spraying operation, and no coating buildup is required. The baffle plate may be covered with peel-away paper for cleaning.

The invention contemplates the use of the columnar filtering unit in spray booths with an exhaust fan directly coupled to the column. The exhaust fan evacuates air from the inner volume of the column. The invention further contemplates an arrangement for larger applications requiring more filtering capacity. In this embodiment, the spray booth includes an interior partition, which divides the booth into a spraying chamber and an exhaust chamber. Two or more columnar filtering units are coupled to the interior partition, which includes holes so that the interior volumes of the columnar filtering units communicate with the exhaust chamber. The exhaust fan exhausts air through the top of the exhaust chamber.

BRIEF DESCRIPTION OF THE DRAWINGS

For a more complete understanding of this invention, reference should now be made to the embodiment of the present invention illustrated in greater detail in the accompanying drawings.

FIG. 1 is an exploded view of one embodiment of a columnar filter of the present invention, unassembled to show the component parts of the invention.

FIG. 2 is a perspective view of a columnar filter of the present invention in its assembled form.

FIG. 3 is a front view of a multiple stage columnar filtering unit.

FIG. 4 is a cross-sectional view of the filter of FIG. 2 through lines 4—4.

FIG. 5 is a cross-sectional view of another filter embodiment of the present invention.

DETAILED DESCRIPTION OF THE INVENTION

Figure 6:
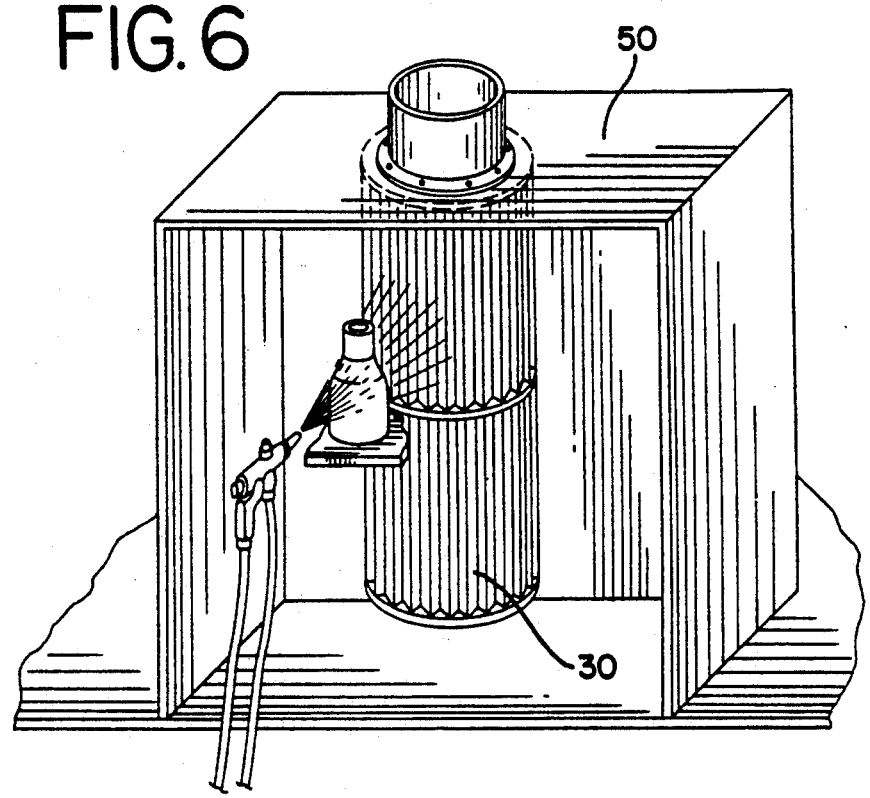
FIG. 6 is a spray booth of the present invention utilizing the multiple stage columnar filtering unit of FIG. 3.

The present invention pertains to a cross-draft spray booth. A cross-draft spray booth includes an enclosure or chamber for coating an object. A cross-draft spray booth further includes a filter media located within the same chamber. The filter media used in cross-draft spray booths typically are inexpensive and are meant to be thrown away when dirty, rather than cleaned. The term "cross-draft spray booth" as used herein does not include booths with cartridge-type filters. Cartridge-type filters generally are used in booths for dry powder applications only and include a second chamber area for the cartridge filter with a special lower section for removal of powder.

As shown in FIGS. 6-9, the cross-draft spray booth of the present invention includes columnar filtering units located in the spray coating chamber. Turning to FIG. 1, the columnar filtering unit of the present invention include a support frame and a filter media. The support frame comprises a top support ring 10, vertical support members 12, a bottom support ring 14, and a bottom closure is. The support rings 10, 14 can be made of angle iron or some other suitable material. The vertical support members 12 are flat strips of steel or angle iron or some other suitable material. The top end 22 of each vertical support member is connected to the support ring 10, by bolting, welding or other connecting means. The bottom end 24 of each vertical support member is connected to the bottom support ring 14, by bolting, welding, or other connecting means. The bottom closure 18 is connected to the bottom support ring 14 by bolting, welding or other connecting means. The bottom closure plate acts as a seal to prevent paint or air from entering the bottom of the column.

The filtering medium 16 is wrapped around the columnar frame. In the embodiment of FIG. i, the ring is about two feet in diameter. As shown in FIG. 1, the bottom ring 14 includes a flange 15 for supporting the filter media. The top ring 10 includes a flange 11 to further secure the filter media to the frame. The filter is wrapped around the frame and placed on the flange 15. A cross-sectional view FIG. 4 shows the bottom support ring 14, the filtering medium 16 on flange 15, the vertical support members 12, and the bottom closure 18. The opposite ends of the filter media 16 are connected by stapling. Alternatively, the filter can be sealed off by some other means, such as tack-welding pins onto one of the vertical support members 12 onto which the filter medium can be fastened, thereby forming a closed cylinder.

This embodiment utilizes semi-rigid non-porous filtering media that require no further support other than the vertical support members 12, such as the readily available Andreae type material. The term "filtering medium" includes filter media such as the Andreae-type filter, spun fiberglass matter, or a paper matter. In filters, the filtering occurs primarily by means of holes or openings formed in the filter, rather than through pores in the material itself. Generally available such filtering media, such as the Andreae-type material, usually come in rolls from 36 to 72 inches wide. The embodiment shown in FIG. 2 utilizes a 36 inch wide roll. If a wider roll is chosen, a center support ring 13 (shown in FIG. 2) can be added to the frame to provide further support for the filter media. The center ring will be of flat steel rather than angled steel so that the fit of the filter media into the top and bottom support rings is not affected.

FIG. 2 shows the assembled columnar filtering unit 40 in a cylindrical shape. Other embodiments of the filtering unit of the present invention may be of shapes other than cylinders, including squares, rectangles, triangles, ellipses and other polygons. It is not necessary that the columnar filter be a cylinder for it to provide the extended filter life of the present invention. Filter media formed into any of those shapes will achieve the baffle effect and the resulting wrap-around air flow.

Figure 7:
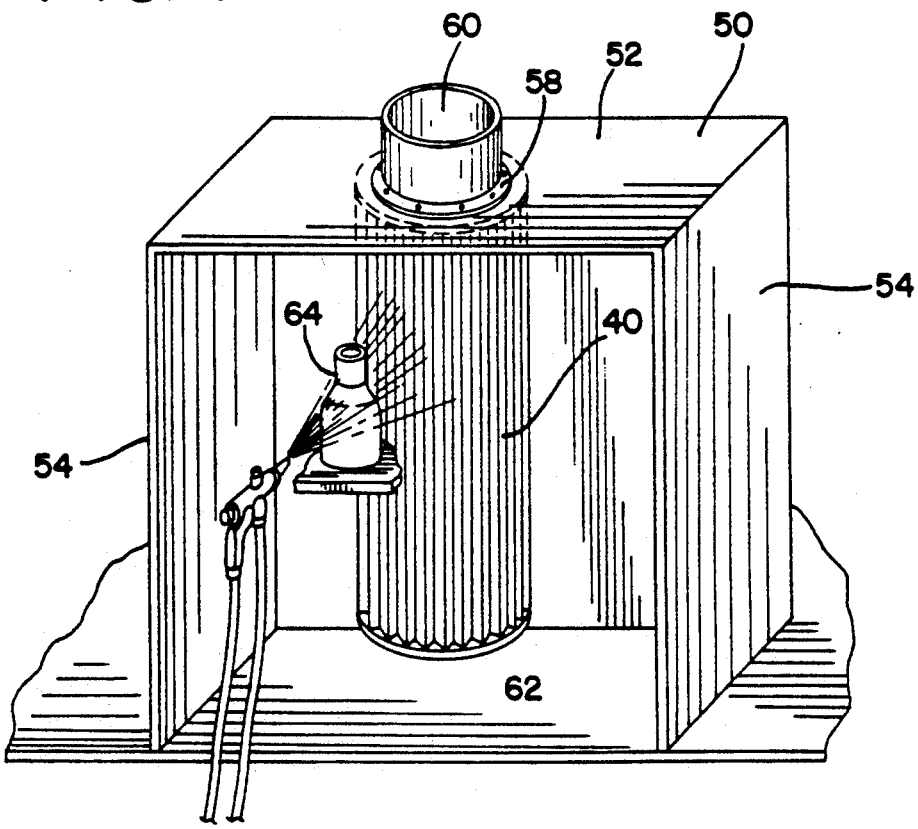
FIG. 7 is a spray booth of the present invention utilizing the single stage columnar filtering unit of FIG. 2

FIG. 7 shows the booth 50 utilizing columnar filtering unit 40. The booth 50 has a top wall 52, side walls 54, and a back wall 56. The booth 50 is constructed of sheet metal or other suitable material. The top wall 52 includes vent opening 58. Exhaust system 60 is coupled to vent opening 58. The exhaust system 60 is the same as that used in a conventional cross-draft booth and is well known in the art. The columnar filtering unit 40 is attached to the booth side of vent opening 58, and is suspended above the floor 62, leaving space below the filter, which facilitates the cleaning of fallen particulate. In an alternate embodiment, the columnar filtering unit rests on the floor with sealing means to prevent air flow through the bottom of the column.

An article to be coated 64 is positioned between a spray gun 66 and columnar filtering unit 40. The open front of the booth serves as the air inlet. As the coating process occurs, the exhaust system 60 draws air from the interior volume of the columnar filtering unit 40. Particulate in the coating stream is trapped by the filtering medium 16. The construction of the filter gives it an extended life. Because the particulate in the overspray of a coating operation has weight and travels with some velocity, it will naturally travel in a somewhat straight line towards columnar filtering unit 40, which is positioned in such a manner as to take advantage of the uni-directional air stream created by the evacuation of air. This air stream causes the particulate to accumulate on the side of the columnar filtering unit closest to the spray gun 66. As the coating operation progresses, the portion of the columnar filtering unit closest to the spray gun 66 slowly becomes loaded with particulate, until it becomes completely clogged. It is at this point that a conventional cross-draft filter would have to be replaced. In the present invention, however, the coating operation can continue The front portion of the filter (the portion closest to the spray gun), which is loaded with particulate, becomes a baffle, which accumulates the particulate that is unable to change direction of travel and reach the sides or back of the columnar filtering unit. At the same time, the baffle forces air flow to wrap around the sides of the column to the uncoated portions of the filter, which continue to transmit air and allow the exhaust system to operate efficiently. The booth continues to provide overspray and fume evacuation.

Eventually, all sides of the filter become substantially clogged, even on the portions farthest from the spray gun 66. At this point the filter must be changed. The filter change can be done quickly, and is accomplished by merely peeling the clogged filter media off the frame and replacing it with new media. Since the filter frame design allows the use of readily available media, the expense is considerably less than replacing canister type filter. This replacement is required much less frequently then in a conventional booth.

FIG 5 is a cross-sectional view of an another embodiment of the present invention. A flexible fully air-penetrable support medium 26, such as wire grid, is wrapped around the columnar frame beneath the filtering medium 16 to provide more support for the filtering medium. This embodiment is used when utilizing a less rigid type of non-porous filter media, such as matte-type or blanket media, which requires more support than just the vertical support members 12.

FIG. 3 shows a two stage columnar filtering unit 30. The bottom support ring 14 of one columnar filtering unit 40a is connected to the top support ring 10 of a second columnar filtering unit 40b, creating multi-stage columnar filtering unit 30. The cylindrical columnar filtering units 40a and 40b may be of the types of FIG. 4 or FIG. 5. In this embodiment, a bottom closure 18 is not attached to the upper columnar filtering unit 40a but is attached to the bottom stage columnar filtering unit 40b. Connecting two single columnar filtering units together in this manner creates a multi-stage columnar filtering unit that is useful in larger applications. FIG. 6 shows the use of the two-stage columnar filtering unit 30 in spray booths 150. Other than the use of a different columnar filtering unit, the operation of the booths is identical.

Figure 8:
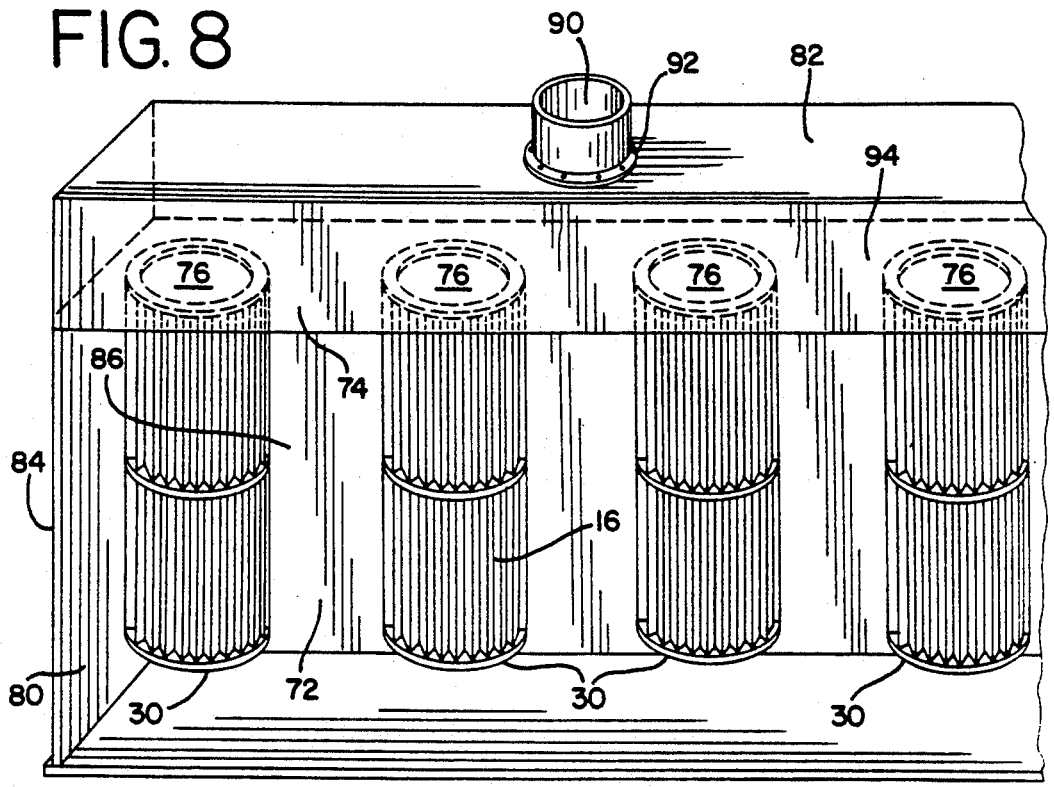
FIG. 8 is a spray booth of the present invention utilizing four two stage columnar filtering units.

FIG. 8 shows a spray coating booth of the present invention in another embodiment for larger applications. Four two-stage columnar filtering units are used. Coating booth 80 consists of top wall 82, side walls 84, and back wall 86. Exhaust system 90 is coupled to vent opening 92. Interior partition 94 and front panel 96 divide booth 80 into an exhaust chamber 74 and a spraying chamber 72, and includes holes 76. Two or more two-stage columnar filtering units 30 are coupled to the interior partition 94 on the spraying chamber side of the interior partition. As the coating process occurs, the exhaust system 90 draws air from the exhaust chamber 74. Air in turn is drawn into the exhaust chamber from the interior volumes of two-stage columnar filtering units 30. As a coating operation occurs, air is drawn from the spray chamber 72 through the two-stage columnar filtering units 30, and particulate in the coating stream is trapped by filtering medium 16.

Figure 9:
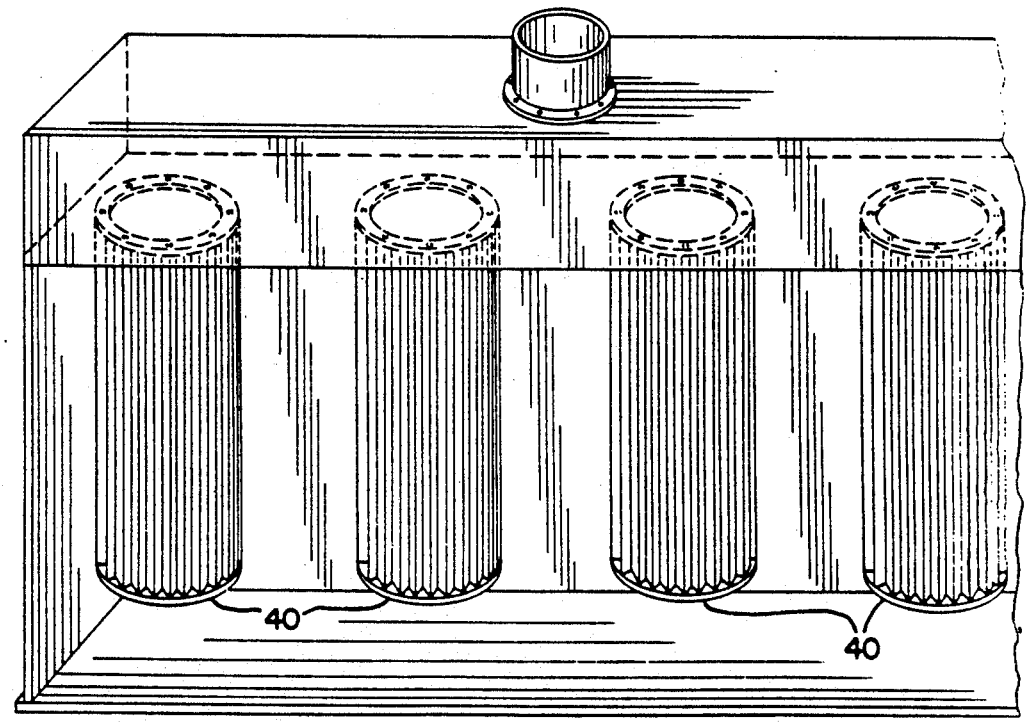
FIG. 9 is a spray booth of the present invention utilizing four single stage columnar filtering units.

FIG. 9 shows an alternate embodiment of FIG. 8 which utilizes four single stage columnar filtering units 40. The operation of the booth is otherwise the same as FIG. 8.

To provide adequate filtering, the columnar filtering units of the present invention should be preferably at least three feet in height, and more preferably over about five feet in height. In addition, the surface area of the columnar filtering unit should preferably be at least 18 square feet, and more preferably at least 36 square feet.

All embodiments of the coating booth shown in the figures are arranged such that the single or multiple columnar filtering units are suspended above the floor of the coating booth to leave space for cleaning of the booth. In any of these embodiments, the columns can extend to and rest on the floor of the booth. In such an arrangement, the bottom closure plate need not be used. Rather, sealing means could be used to seal any openings or cracks between the floor and the bottom ring.

In another alternate embodiment of the present invention, the front section of the columnar filtering unit (the portion closest to the spray operation) may be solid material rather than filter media. This solid material would serve as a baffle throughout the entire coating operation, rather than having the baffle form by particulate loading on a filter. The baffle plate may be covered with peel-away paper for cleaning.

In this embodiment, the columnar filtering unit has two sections, a front section and a rear section. The front section (closest to the coating operation) is a baffle plate, as opposed to filter media, which extends from the top to the bottom of the column. The baffle would cover an arc of at least 45° and more preferably at least 90°. The center of the baffle would be located on the portion of the columnar unit closest to the spraying operation. The rear section of the columnar unit would comprise the filter media. Thus, the baffle plate in combination with the filter media would form the columnar shape of the present invention.

Such an arrangement would obtain the benefits of the present invention because it would achieve the baffle effect and wrap around air flow. Thus, the present invention contemplates different configurations of a filtering unit which includes a rear portion facing away from the spray operations (e.g. the rear half of the columnar unit of FIG. 7) to obtain baffle affect/wrap-around air flow.

Having thus described the invention, what is claimed is:

1. A process for separating suspended paint particles from a fluid stream in a cross-draft spray booth; said booth comprising an air inlet, a wet operation spray chamber, an exhaust system and at least one columnar filtering unit located in said spray chamber; said filtering unit connected to said exhaust system by an exhaust outlet and said filtering unit having a filtering medium on at least a portion thereof; said process comprising:
   projecting a fluid stream with paint particles at an object to be painted;
   drawing air flow containing said fluid stream to said filtering unit by drawing air flow through said air inlet and said spray chamber to said columnar filtering unit and out said exhaust outlet; and
   accumulating the paint particles in the fluid stream on the frontal side of said filtering unit causing the air flow to wrap around said filtering unit to enter said filtering medium.

2. The process of claim 1 wherein said columnar filtering unit is cylindrical.

3. The process of claim 1 wherein said columnar filtering unit comprises a multi-stage columnar component.

4. The process of claim 3 wherein said columnar filtering unit is cylindrical.

5. A process for separating suspended paint particles from a fluid stream in a cross-draft spray booth comprising an air inlet, a spray chamber, an exhaust system and at least one columnar filtering unit, said filtering unit having (1) a filtering medium comprising at least the rear portion thereof and (2) a baffle plate on the central frontal area thereof, said filtering unit located in said spray chamber and connected to said exhaust system by an exhaust outlet, said process comprising:
   (a) projecting at the object to be painted a fluid stream with paint particles,
   (b) drawing air flow containing said fluid stream to said filtering unit by drawing air flow through the air inlet and spray chamber to the columnar filtering unit and out the exhaust outlet and
   (c) accumulating paint particles in the fluid stream on the central area of the front half of said filtering unit causing air flow to wrap around said filtering unit to enter said filtering medium.

6. The process of claim 5 wherein said columnar filtering unit is cylindrical.

7. The process of claim 5 wherein said columnar filtering unit comprises a multi-stage columnar component.

8. The process of claim 7 wherein said columnar filtering unit is cylindrical.

9. A cross-draft spray booth comprising an air inlet, a wet-operation chamber, an exhaust system and a columnar filtering unit connected to said exhaust system and located within said spray chamber, an exhaust outlet for said column filtering unit for connection to said exhaust system, a filtering medium on at least a portion of said filtering unit, and means on the central frontal area of said filtering unit for diverting air flow which enters said columnar filtering unit.

10. The cross-draft spray booth of claim 9 wherein said filtering medium is on substantially the entirety of said columnar filtering unit and wherein said air inlet and said columnar filtering unit are arranged so that in use said diverting means has been formed by paint particles initially accumulating on said filtering medium located on said frontal area of said filtering unit.

11. The cross-draft spray booth of claim 9 wherein said columnar filtering unit is connected to a wall of said spray chamber.

12. The cross-draft spray booth of claim 9 or 11 wherein said columnar filtering unit is cylindrical.

13. The cross-draft spray booth of claim 12 wherein said filtering medium has a surface area of at least 18 square feet.

14. The cross-draft spray booth of claim 13 wherein said filtering medium has a surface area of at least 36 square feet.

15. A columnar filtering unit for use in a cross-draft spray booth comprising:
   (a) a top support ring, a bottom support ring, and vertical support members with top and bottom ends, said top ends of said vertical support members connected to said top support ring, said bottom ends of said vertical support members connected to said bottom support ring, said vertical support members connecting said top support ring and said bottom support ring to create a columnar support frame,
   (b) a filtering medium wrapped around and attached to at least a portion of said columnar support frame,
   (c) a baffle plate on the central frontal area of said columnar filtering unit for diverting flow entering said columnar filtering unit and
   (d) an exhaust outlet for connection to an exhaust system.

16. The columnar filtering unit of claim 15 wherein said support frame further comprises a flexible, fully air-penetrable support medium wrapped around said columnar form beneath said filtering medium.

17. The columnar filtering unit of claim 15 wherein the shape of the columnar filtering unit is cylindrical.

18. The columnar filtering unit of claim 15 wherein a second columnar filtering unit is attached to the bottom of said columnar filtering unit such that the axes of said columnar filtering units are aligned.

19. A columnar filtering unit for use in a cross-draft spray booth filtering unit comprising: an exhaust outlet for connection to an exhaust system, a filtering medium on at least a portion of said columnar filtering unit and a baffle plate on the central frontal area of said columnar filtering unit for diverting flow entering said columnar filtering unit.

20. The columnar filtering unit of claim 19 wherein said baffle plate covers an arc of at least 45°.

21. The columnar filtering unit of claim 20, wherein said baffle plate covers an arc of at least ob 90°.

22. The columnar filtering unit of claim 19, 20 or 21 wherein said filtering medium has a surface area which is at least 18 square feet.

23. The filtering unit of claim 22 wherein said filtering medium has a surface are of at least 36 square feet.

24. The filtering medium of claim 22 wherein said columnar shape is cylindrical.

25. A cross-draft spray booth comprising an air inlet, a spray chamber, an exhaust system and a columnar filtering unit connected to said exhaust system and located within said spray chamber, an exhaust outlet for said columnar filtering unit for connection to said exhaust system, a filtering medium comprising at least the rear portion of said filtering unit, and a baffle plate on the central frontal area of said filtering unit for diverting flow which enters said columnar filtering unit.

26. A cross-draft spray booth of claim 25 wherein said baffle plate covers an arc of at least 45°.

27. A cross-draft spray booth of claim 26 wherein said baffle plate covers an arc of at least 90°.

28. A cross-draft spray booth of claim 26 wherein said columnar filtering unit is connected to a wall of said spray chamber.

29. A cross-draft spray booth of claim 23, 26 or 27 wherein said columnar filtering unit is cylindrical.

30. A cross-draft spray booth of claim 29 wherein said filtering medium has a surface area which is at least 18 square feet.

31. A columnar filtering unit of claim 30 wherein said filtering medium has a surface area which is at least 36 square feet.

* * * * *

UNITED STATES PATENT AND TRADEMARK OFFICE
CERTIFICATE OF CORRECTION

PATENT NO. : 5,306,332
DATED : April 26, 1994
INVENTOR(S) : George E. Allen

It is certified that error appears in the above-indentified patent and that said Letters Patent is hereby corrected as shown below:

Column 4, line 28, delete "is" and insert therefore --18--.

Column 4, line 42, delete "FIG. i" and insert therefore --FIG. 1--.

Signed and Sealed this

Ninth Day of August, 1994

Attest:

BRUCE LEHMAN

Attesting Officer     Commissioner of Patents and Trademarks